(No Model.)
C. F. KNAUER.
SAW SET.
No. 461,836. Patented Oct. 27, 1891.
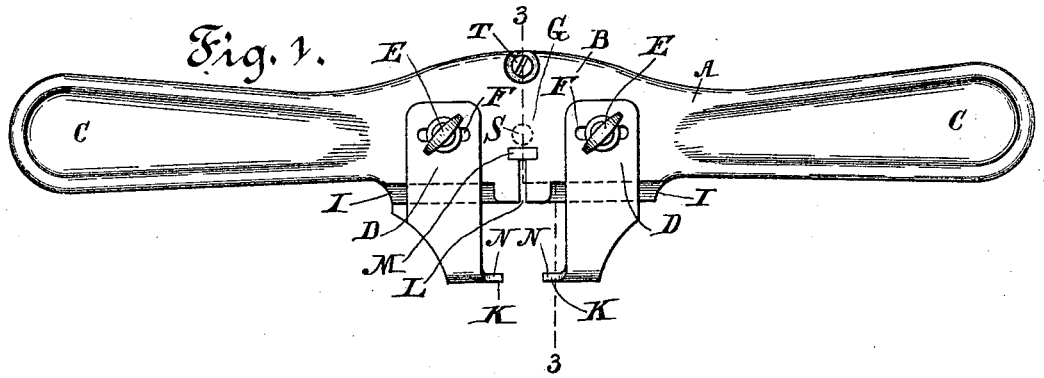
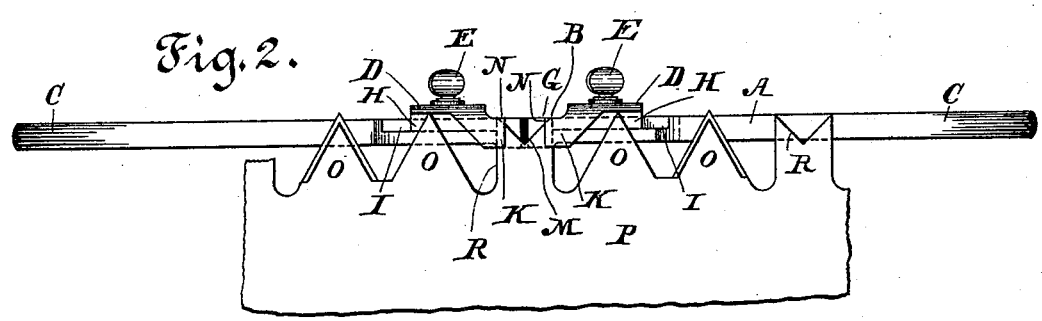
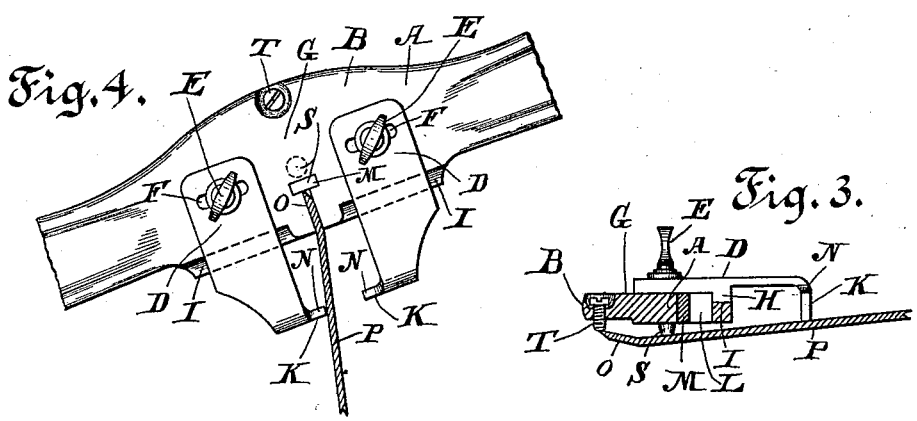
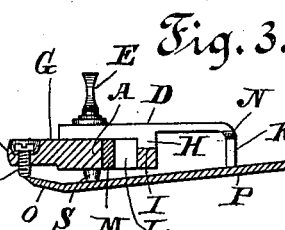
Witnesses:
C. N. Keeney.
Anna V. Faust.
Inventor
Charles F. Knauer
by Curtis T. Benedict
Attorney.

UNITED STATES PATENT OFFICE.

CHARLES F. KNAUER, OF PLYMOUTH, WISCONSIN.

SAW-SET.

SPECIFICATION forming part of Letters Patent No. 461,836, dated October 27, 1891.

Application filed January 10, 1891. Serial No. 377,313. (No model.)

*To all whom it may concern:*

Be it known that I, CHARLES F. KNAUER, of Plymouth, in the county of Sheboygan and State of Wisconsin, have invented a new and useful Improvement in Saw-Sets, of which the following is a description, reference being had to the accompanying drawings, which are a part of this specification.

My improved device is adapted to serve as an instrument for giving set to the teeth of large saws, and belongs to that class of saw-sets that are held in the hands of the operator and are used to set the teeth of a saw secured in a fixed or permanent position. The device is also so constructed as to adapt it for gaging the set of the saw-teeth and the length of the clearing or raker teeth.

In the drawings, Figure 1 is a view of the complete device. Fig. 2 is a front edge view of the same device, a fragment of a saw being shown therewith to illustrate the use of the tool for gaging the length of the raker-teeth. Fig. 3 is a transverse section of the tool on line 3 3 of Fig. 1, a saw being also shown in transverse section therewith to illustrate the use of the tool for gaging the set of a saw-tooth. Fig. 4 is a view of a fragment or central portion of the tool with a saw in transverse section therewith, illustrating the method of setting a tooth by this tool.

A metal bar A forms the principal part of the tool and is constructed with a body part B and terminal handles C C. Two arms D D are secured adjustable toward and from each other on one side of the body B by means of thumb-screws E E passing through slots F F in the arms D D and turning into the body B. The surface G of the body B is flat, and the arms D D are placed thereon and project beyond the edge of the body B. The arms D D are provided with transverse ribs or flanges H H, which fit into grooves or channels I I therefor in the surface G at its front edge, whereby the arms D D are held against swinging on the thumb-screws E E as pivots, and are held to direct reciprocal motion when adjusted toward and from each other. The arms D D are also provided with inwardly-projecting parts or fingers K K, the inner ends of which are at a little distance apart, and are to be adjusted by the lateral movement of the arms D D to equal distances from the extension of the plane of the recess or socket L in the front edge of the body of the tool. The recess L, extending from the front edge of the body of the tool inwardly as far as the length of the teeth of the saw with which this tool is adapted to be used, is closed at its end by a transverse soft-metal plug M, adapted to serve as a cushion to receive the point of the tooth on which the tool is placed to set it. The top surfaces N N of the fingers K K are in the extension of the plane of the surface G of the body A, so that when the tool is turned on its side and the arms D D are placed on the saw-teeth O O of the saw P the raker-tooth R will be in the space between the arms D D, and its point can be taken off by a flat file down to the surfaces G and N N. In this manner the raker-tooth can be made of proper length, which length is ordinarily a little less than the length of the saw-teeth. This difference in the length of the saw-teeth and raker-teeth is gaged by my device, as it will be noticed by reference to Fig. 3 that the under surface of the arms D D, outside of the ribs H, are in that figure in a higher plane than the surface G of the body of the tool. For setting the teeth of the saw the tool is placed on a tooth and is then tilted to right or left, as is necessary to set the tooth, in the manner shown in Fig. 4.

A stud S projects centrally from the under surface of the body of the tool, and a set-screw T turns through the tool at a little distance to the rear therefrom. The under surface of the fingers K K and the outer surface of the stud S are arranged in a plane with reference to each other, so that these surfaces may be placed against the side of the saw, and the set-screw T being adjusted at a proper relation to that plane the tool will serve as a gage to ascertain or adjust the desired set of the teeth of the saw.

What I claim as new, and desire to secure by Letters Patent, is—

1. In a saw-set, the combination, with a body part having a flat surface and a medial recess extending into the body and in the flat surface for receiving a saw-tooth, of laterally-projecting arms bearing movably against the flat surface and held adjustably thereto by set-screws passing through slots in the arms, ribs or guides on the arms fitting and traveling in ways therefor in the body, and fingers projecting from the free end of the arms toward each other and in front of the body of the saw-set on each side of the plane of the saw-tooth recess, substantially as described.

2. A saw-set comprising a body with outwardly-projecting handles and provided with a saw-tooth-receiving recess, arms, as D D, having lateral slots F F, ribs H H, and fingers K K, secured adjustably to the body of the tool by means of thumb-screws passing through the slots F F and turning into the body of the tool, substantially as described.

3. In a saw-set, the combination, with the body B, having a flat surface G, of laterally-extending arms D D, supported and adjustable toward and from each other on the surface G, inwardly-turned fingers K K, projecting laterally from the arms toward each other, which inwardly-projecting parts of the fingers have upper surfaces N N in the plane of the surface G, substantially as described.

4. In a saw-set, the combination, with the body B, having a medial stud S, of arms D D, projecting toward the front, fingers K K, projecting at right angles thereto, and an adjusting-screw T, turning through the body B in the rear of the stud S, the under surfaces of the fingers K K, the ends of the stud A, and the screw T being constructed and arranged to form an adjustable gage, substantially as described.

In testimony whereof I affix my signature in presence of two witnesses.

CHARLES F. KNAUER.

Witnesses:
W. A. LEASON,
JOS. F. ZIEGLER.